Patented Oct. 30, 1928.

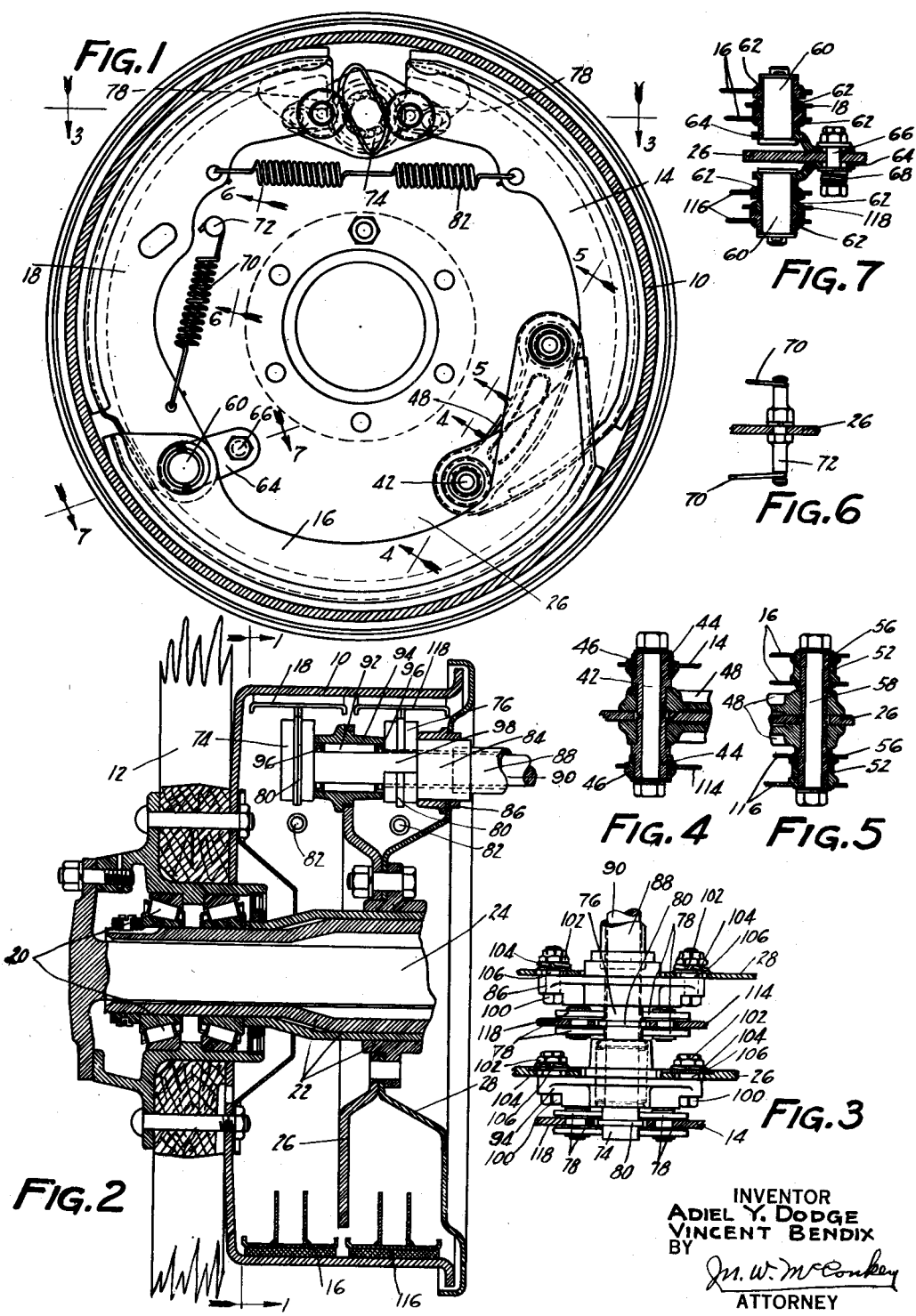

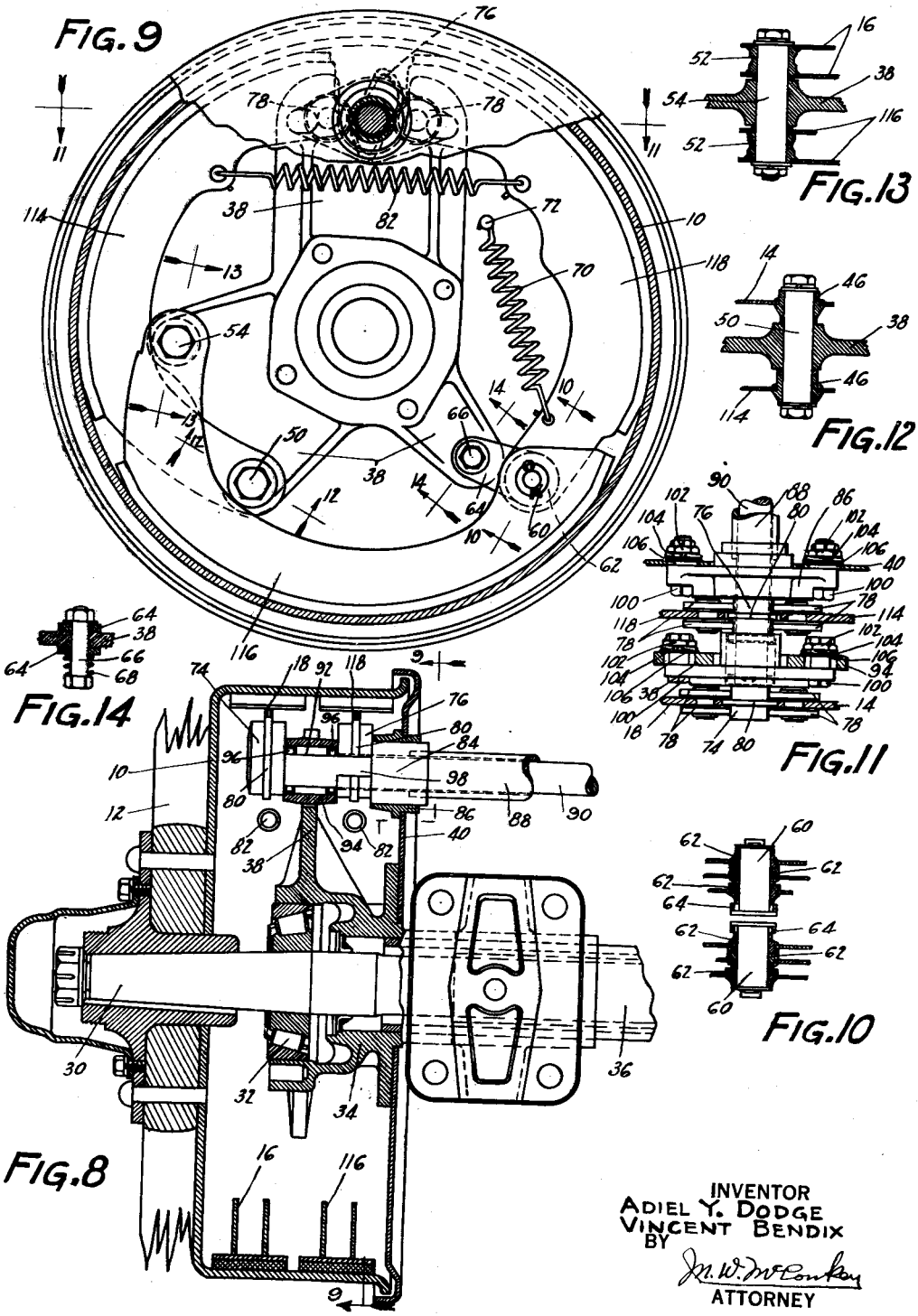

1,689,767

UNITED STATES PATENT OFFICE.

VINCENT BENDIX, OF CHICAGO, ILLINOIS, AND ADIEL Y. DODGE, OF SOUTH BEND, INDIANA, ASSIGNORS TO BENDIX BRAKE COMPANY, OF CHICAGO, ILLINOIS, A CORPORATION OF ILLINOIS.

DUPLEX BRAKE.

Application filed December 4, 1926. Serial No. 152,545.

This invention relates to brakes, and is illustrated as embodied in a duplex rear automobile brake. Most of the features of novelty have special reference to simplifying duplex brakes of the type in which there are two friction devices (e. g. the service and emergency brakes) arranged side by side and engageable with adjacent zones of the drum surface.

Various features of novelty relate to the supporting of the brake-applying means, to an improved arrangement of the anchor or anchors, to the provision of novel automatically-adjusted positioning devices, and to other novel arrangements of parts and desirable particular constructions which will be apparent from the following description of the illustrative embodiments shown in the accompanying drawings, in which:

Figure 1 is a vertical section through the brake, just inside the head of the brake drum, and showing the shoes of the outer brake in side elevation;

Figure 2 is a section diametrically through the brake, showing the brake-applying means and showing the mounting of the brake with respect to the end of a full-floating rear drive axle;

Figure 3 is a partial section on the line 3—3 of Figure 1, showing the arrangement of the applying devices of the two parts of the duplex brake;

Figure 4 is a partial section on the line 4—4 of Figure 1, showing one of the anchors;

Figure 5 is a partial section on the line 5—5 of Figure 1, showing the other anchor;

Figure 6 is a partial section on the line 6—6 of Figure 1, showing the post to which two of the return springs are secured;

Figure 7 is a partial section on the line 7—7 of Figure 1, showing the automatically adjusted positioning devices;

Figure 8 is a vertical section, corresponding to Figure 2, diametrically through a different brake, showing the arrangement of the parts with respect to one end of a semi-floating axle;

Figure 9 is a vertical section on the line 9—9 of Figure 8, looking toward the brake from the open side of the drum;

Figure 10 is a partial section on the line 10—10 of Figure 9, showing the connection between the shoes and showing parts of the automatically adjusted positioning devices;

Figure 11 is a partial section on the line 11—11 of Figure 9, showing the brake-applying means.

Figure 12 is a partial section on the line 12—12 of Figure 9, through one of the anchors;

Figure 13 is a partial section on the line 13—13 of Figure 9, through the other anchor; and Figure 14 is a partial section on the line 14—14 of Figure 9, showing the frictional clamping of the inner ends of the automatically adjusted positioning devices.

Each brake comprises generally a drum 10, rotating with a wheel 12, and within which are arranged side by side, to be engageable with adjacent zones of the drum surface, two friction devices, one comprising three shoes 14, 16, and 18 and the other comprising three shoes 114, 116, and 118. The shoes making up the friction devices are in each case substantially the same in construction and arrangement.

Shoes 14, 114, 18, and 118 are all substantially T-shaped in cross-section, being formed of an outer arcuate band to which the lining is secured and which is reinforced by a separate web member welded to its inner face. Shoes 16 and 116 are provided with two stiffening webs welded on their inner faces and at their ends straddling the ends of the other shoes.

The brake of Figures 1–7 is arranged on a full-floating axle, as shown in Figure 2. The wheel 12 is supported by anti-friction bearings 20 on the end of the axle casing 22, and is driven by the live axle 24. Casing 22 has secured thereto two supports 26 and 28, the first arranged between the two friction devices of the brake and the other arranged at the open side of the drum.

The brake of Figures 8–14 is arranged on a semi-floating axle as shown in Figure 8. The wheel is driven by a live axle 30 supported by an anti-friction bearing 32 in a casting 34 forming the end of the axle housing 36. The casting 34 has an integral flange or flanges 38 extending between the two friction devices and forming a fixed support, and has secured thereto a separate plate 40 forming a second support at the open side of the drum.

The shoes 14 and 114 of the brake of Figures 1–7 are anchored on opposite ends of a pivot 42 passing through the support 26. Pivot 42 preferably passes through separate bushings 44 forming bearings for bushings 46 secured in the ends of shoes 14 and 114, and shouldered to have their adjacent ends pressed into an opening in the end of reinforcing plates or forgings 48 engaging opposite faces of support 26. In the brake of Figures 8–14, the shoes 14 and 114 are pivoted directly on opposite ends of an anchor 50 secured at its center in support 38.

Similarly shoes 16 and 116 have at their ends bushings 52, either sleeved directly on an anchor pivot 54 (Figure 13) centrally secured to the support 38, or sleeved on bushings 56 pressed into openings in the ends of reinforcing plates 48 and held by a pivot or bolt 58 serving as the torque-taking anchor.

In both modifications of the brake, it will be seen that shoes 14 and 16, and 114 and 116, overlap each other, the anchored ends of shoes 16 and 116 straddling the anchored ends of shoes 14 and 114, thus bringing the anchor of each of the pair in the same brake friction device between the ends of the other of the pair. This brings the friction portions of the shoes immediately adjacent each other, thus increasing the surface in frictional engagement with the drum and making the brake more efficient, and at the same time minimizing distortion of the drum.

The adjacent ends of shoes 18 and 16, and 118 and 116, are connected by floating pivots 60 passing through bushings 62 in the ends of the shoes. Pivots 60 also pass through openings in the outer ends of radially-extending automatically-adjusted positioning members 64 frictionally clamped at their inner ends against opposite sides of support 26 (Figure 7) or 38 (Figure 9).

The means illustrated for frictionally clamping the inner ends of the adjusting or positioning members 64 includes a bolt 66 (Figures 7 and 14) passing through the support 26 or 38 and having at one end a friction washer engaging one of members 64 and having sleeved on the other end a coil spring 68 compressed and confined between the head of the bolt and a friction washer engaging the other of the members 64. The openings in members 64 may be slotted radially of the drum (Figure 7), as there is no occasion for close fit in that direction, but preferably fit closely on the pivots 66 in a direction at right angles to the radius (see Figure 14).

The openings in the outer ends of members 64 are greater, at least in a brake-applying direction, than the diameter of pivots 60 by a clearance just equal to the desired brake-releasing movement of the pivots. Now when one of the friction devices is applied to the drum, shoe 18 or 118, acting against the resistance of an auxiliary return spring 70, forces shoe 16 or 116 against the drum, at the same time moving pivot 60 to take up the clearance in the opening in the adjusting member 64 and then shift the adjusting member angularly against the frictional resistance at its inner end, as far as may be necessary to force shoe 16 or 116 fully against the drum. Then when the brake is released, spring 70 returns shoe 16 or 116, pulling it away from the drum a predetermined distance, whereupon pin 60 again engages the member 64, thus giving predetermined clearance of shoes 16 and 116 with respect to the drum in brake-released position.

Springs 70 are secured at their upper ends to opposite ends of a post 72 passing through support 26 or 38 and centrally secured to the support.

Shoes 14 and 18, or 114 and 118, are forced apart in applying the brake by one of two devices such as cams 74 or 76 engaging sets of rollers 78 arranged on opposite sides of the webs of the shoes, and having ribs 80 projecting between the rollers of each pair to position the corresponding shoe laterally. The shoes are forced apart by the cams in applying the brake against the resistance of return springs 82 connecting the shoes.

Cam 76 is preferably formed as an integral extension of a hollow shaft portion 84 journaled in a support or bracket 86 carried by support 28 or 40, and secured to the extreme end of a hollow camshaft 88, ordinarily operated by the emergency brake connection.

Within hollow camshaft 88 is arranged a solid camshaft 90 carrying at its end the cam 74, which may be integral with the shaft or may be keyed or otherwise secured thereto. Shaft 90 will ordinarily be operated by the service brake connections, and is preferably supported by anti-friction rollers 92 arranged around the outside of the shaft in a bearing formed in a support or bracket 94. Rollers 92 are confined against endwise movement by cams 74 and 76, washers 96 being loosely inserted between the sides of the cams and the ends of the rollers if desired.

In order to have the shaft 90 as large and strong as possible, and yet have cams 74 and 76 of the same size and outline, cam 76 may be cut away at the top on the side next shoe 14 or 114, as shown at 98 in Figures 2 and 8. This amounts to saying that at this point, which is not used in applying the brake, the surface of cam 76 may be substantially tangent to the surface of shaft 90.

Bracket 86 is secured to its support 28 or 40, and bracket 94 is secured to its support 26 or 38, by frictional clamping means permitting the brackets to shift, if necessary, to center their respective cams when the brake is applied. This frictional means may take the form of bolts 100 passing through slots in the supports, and carrying nuts 102 compressing spring lock washers 104 against friction washers 106 engaging the faces of the supports opposite the brackets.

Bracket 86 has a central boss forming the bearing for hollow shaft portion 84, and which projects through a slightly larger opening in support 28 or 40, to permit the above-described shifting of the bracket.

Bracket 94 has a boss forming the bearing containing rollers 92, and projecting through an opening in support 26 or 38, this opening preferably being a radial slot extending inwardly from the edge of the support. By this arrangement, before the wheel and drum are in place, the entire brake control, including the coaxial shafts 88 and 90 and the brackets 86 and 92, may be inserted from the left in Figures 2 and 8, inclined downwardly, and after bracket 86 is in place bracket 92 may be swung downwardly into place in the radial slot in support 26 or 38.

While two illustrative embodiments have been described in detail, it is not our intention to limit the scope of this invention to those particular embodiments, or otherwise than by the terms of the appended claims.

We claim:

1. A duplex brake comprising, in combination, a drum, a pair of friction devices arranged side by side, a support between the friction devices, an anchor secured to the support and extending therefrom in opposite directions and engaged by the two friction devices, and reinforcing plates engaging opposite sides of the support and additionally supporting said anchor.

2. A duplex brake comprising, in combination, a drum, a pair of friction devices arranged side by side and each including a pair of shoes overlapping at their ends, a support between the friction devices, a pair of anchors secured to the support and extending therefrom in opposite directions and each engaged by one of the two overlapping ends of said shoes in each of the friction devices, and reinforcing plates engaging opposite sides of the support and connecting and additionally supporting said anchors.

3. A duplex brake comprising, in combination, a drum, a pair of friction devices arranged side by side and each including a pair of shoes overlapping at their ends, a support between the friction devices, and a pair of anchors secured to the support and extending therefrom in opposite directions and each engaged by one of the two overlapping ends of said shoes in each of the friction devices.

4. A duplex brake comprising, in combination, a drum, a pair of friction devices arranged side by side and engageable with adjacent zones of the drum, a support between the two friction devices, applying devices arranged on opposite sides of said support and operatively engaging the respective friction devices, a pair of coaxial shafts extending into the drum and actuating the applying devices, the outer of said shafts terminating short of said support and the inner one extending through the support, a bearing for said inner shaft carried by the support, and anti-friction rollers between the bearing and the inner shaft and which are confined against endwise movement by the two applying devices.

5. A duplex brake comprising, in combination, a drum, a pair of friction devices arranged side by side and engageable with adjacent zones of the drum surface, a support between the two friction devices, a post centrally secured to the support and extending in opposite directions therefrom, and a pair of return springs, each connected at one end to one end of said post and at the other end to the corresponding friction device.

6. A duplex brake comprising, in combination, a drum, a pair of friction devices arranged side by said and engageable with adjacent zones of the drum surface, a support between said friction devices, a pair of adjusting members arranged respectively on opposite sides of the support and having portions engaged by the corresponding friction devices after predetermined brake-applying or brake-releasing movement, and a fastening passing through the support and the two adjusting members and frictionally clamping the adjusting members to the support.

7. A duplex brake comprising, in combination, a drum, a pair of friction devices arranged side by side and engageable with adjacent zones of the drum surface, a support between said friction devices, and a pair of adjusting members frictionally clamped respectively to opposite sides of the support and having portions engaged by the corresponding friction devices after predetermined brake-applying or brake-releasing movement.

8. A duplex brake comprising, in combination, a drum, a pair of friction devices arranged side by side and engageable with adjacent zones of the drum surface, a support between said friction devices, and a pair of radially-arranged adjusting members on opposite sides of the support and frictionally clamped to the support at their inner ends and having at their outer ends portions engaged by the respective friction devices after predetermined brake-applying or brake-releasing movement.

9. Duplex brake mechanism including two controls comprising coaxial shafts, the inner projecting beyond the end of the outer, brake-applying devices on the ends of the two shafts, a first bracket just inside the applying device on the outer shaft and in which the outer shaft is journalled, a second bracket between the two applying devices and in which the inner shaft is journalled, a support for the first bracket having an opening into which the assembled control may be passed lengthwise and to which support the first bracket is secured, and a second support for the second bracket having a radial notch to receive a portion of the second bracket by a swinging movement radially inward when the assembled control has been positioned lengthwise with the first bracket in engagement with its support, and to which second support the second bracket is secured.

10. Duplex brake mechanism including a control comprising coaxial shafts having cams at their ends, the inner shaft projecting beyond the end of the outer, and the cam at the end of the outer shaft being cut away at one side to permit the use of shafts of large diameter.

11. A brake control comprising a shaft with a cam at its end, and an anti-friction bearing for the shaft including rollers held by the cam against lengthwise movement in one direction.

In testimony whereof, we have hereunto signed our names.

VINCENT BENDIX.
ADIEL Y. DODGE.